US007356492B2

(12) United States Patent
Hazi et al.

(10) Patent No.: US 7,356,492 B2
(45) Date of Patent: *Apr. 8, 2008

(54) METHOD AND SYSTEM FOR GENERATING USER DEFINED TIMESHARED DERIVATIVE ELECTRONIC CATALOGS FROM A MASTER CATALOG

(75) Inventors: Ariel Hazi, Los Angeles, CA (US); Paul N. Weinberg, Los Angeles, CA (US); Matan Arazi, Los Angeles, CA (US); Dave L. Sullivan, Sherman Oaks, CA (US); Philip A. Tinari, Beverly Hills, CA (US); David E. Brookler, Los Angeles, CA (US)

(73) Assignee: SAP, Aktiengesellschaft, Walldorf (DE)

( * ) Notice: Subject to any disclaimer, the term of this patent is extended or adjusted under 35 U.S.C. 154(b) by 191 days.

This patent is subject to a terminal disclaimer.

(21) Appl. No.: 10/911,232

(22) Filed: Aug. 4, 2004

(65) Prior Publication Data

US 2005/0125310 A1 Jun. 9, 2005

Related U.S. Application Data

(63) Continuation of application No. 09/577,268, filed on May 23, 2000, now Pat. No. 7,103,605.

(60) Provisional application No. 60/170,283, filed on Dec. 10, 1999.

(51) Int. Cl.
*G06F 17/30* (2006.01)
(52) U.S. Cl. ....................................... 705/27
(58) Field of Classification Search ................ 705/26, 705/27
See application file for complete search history.

(56) References Cited

U.S. PATENT DOCUMENTS 5,319,542 A * 6/1994 King et al. ................... 705/27

(Continued)

FOREIGN PATENT DOCUMENTS

FR 2738368 A1 * 3/1997

(Continued)

OTHER PUBLICATIONS

Wildstrom, Stephen H., "Service With A Click; New Web Technology Zeroes In On Your Tastes To Personalize Online Shopping," Business Week, Iss. 3519, New York, Mar. 24, 1997, p. 19.*

(Continued)

*Primary Examiner*—Yogesh C. Garg
*Assistant Examiner*—Amee A. Shah
(74) *Attorney, Agent, or Firm*—Dalina Law Group, P.C.

(57) ABSTRACT

A system and method for providing a timeshared electronic catalog is disclosed. The system comprises an electronic database having a plurality of data records that comprise a master data set. The system comprises at least a first and second subset of the data records, wherein each subset comprises one or more data records selected from the master data set. The system includes a software program comprising a data record masking module for selectively providing a first view for displaying one of the subsets to a first user. Each of the plurality of data records contains a plurality of data elements, or fields, or attributes. The data record masking module is further for selecting which data elements are provided in the view. The system further includes a means for selectively providing which executable features from a plurality of executable features may be provided with each view.

20 Claims, 7 Drawing Sheets

U.S. PATENT DOCUMENTS

| | | | |
|---|---|---|---|
| 5,649,181 A * | 7/1997 | French et al. | 707/3 |
| 5,706,495 A * | 1/1998 | Chadha et al. | 707/2 |
| 5,715,448 A * | 2/1998 | Suzuki et al. | 707/9 |
| 5,852,821 A * | 12/1998 | Chen et al. | 707/3 |
| 5,874,964 A * | 2/1999 | Gille | 715/853 |
| 6,049,777 A * | 4/2000 | Sheena et al. | 705/10 |
| 6,092,049 A * | 7/2000 | Chislenko et al. | 705/10 |

FOREIGN PATENT DOCUMENTS

| | | |
|---|---|---|
| GB | 2341700 A * | 3/2000 |

OTHER PUBLICATIONS

Sheth, B.; Maes, P.; "Evolving agents for personalized information;" IEEE Comput. Soc. Press, 1993, p. 345-51.*

Morita, M.; Shinoda, Y.; "Information filtering based on user behavior analysis and best match text retrieval;" Springer-Verlag, 358 pp., 1994.*

* cited by examiner

METHOD AND SYSTEM FOR GENERATING USER DEFINED TIMESHARED DERIVATIVE ELECTRONIC CATALOGS FROM A MASTER CATALOG

RELATED APPLICATIONS

This application is based on provisional patent application Ser. No. 60/170,283 filed Dec. 10, 1999, the contents of which are hereby incorporated herein by reference. This application is a Continuation of utility patent application Ser. No. 09/577,268 filed May 23, 2000, now U.S. Pat. No. 7,103,605 the contents of which are hereby incorporated herein by reference.

BACKGROUND OF THE INVENTION

1. Field of the Invention

The present invention relates generally to a computer-implemented method of production of print and electronic catalogs, and more particularly to systems which produce catalogs that each appear to have their own unique view, yet are all derived from a single copy of the master catalog without any performance or administrative overhead. Still more specifically, the present invention relates to a data structure and set of functional methods for storing, updating, classifying and maintaining similar and dissimilar product information from an unlimited number of manufacturers, along with linked multimedia content and associated metadata, along with functionality that allows for creation of dynamic and customized electronic and printed presentation of the master catalog and derivatives thereof.

2. Description of the Prior Art and Related Information

Heretofore, creating a catalog was an expensive, time-consuming and arduous process that involved many different technologies. Steps included collecting product data from multiple sources, scanning and processing images, laying everything out, and then repeating the process several times in order to obtain the proper layout. Even after overcoming all of these obstacles, a manual, multi-step process that is labor-intensive, time-consuming and very expensive would still be required. Every time a catalog is updated or republished, it is necessary to start over from scratch.

As a result of the obstacles stated above, publishing a professional-quality catalog with a large number of items was within the reach and scope only of large and well-funded organizations. Smaller entities had to either resort to co-branding and licensing a ready-made catalog, or make do with compilation of manufacturer-supplied data sheets and other information in a variety of formats and styles.

Thus, there is a need for a system that overcomes all of the shortcomings described previously. In addition, there is a need for a system that allows for rapid update and integration of new product information, specifications and media content into the system, with the updates becoming immediately visible to all users of all subset catalogs. There is further a need for a system that provides for a very short and cost-effective catalog ramp-up, because it eliminates the need to design, develop, deploy, and debug a custom catalog solution.

SUMMARY OF THE INVENTION

The present invention overcomes the shortcomings of current systems described above. Accordingly, several objectives and advantages of the present invention are to enable the rapid creation of a professionally designed online electronic commerce presence for organizations that would not otherwise have the means to do so previously or independently; to quickly, cheaply and efficiently create seemingly custom catalogs that are pre-populated with product information, and make those catalogs accessible to a vast number of users; to support multiple users accessing a single, master catalog database without any performance or administrative overhead; and to allow product distributors to produce catalogs that appear to be of their own creation and that present their own corporate identity.

Additionally, the current invention abstracts catalog content from presentation format, to enable template-driven catalog creation. It further provides a remote interface for efficient update and maintenance of product information. Furthermore, statistics (such as user preferences, shopping patterns and browsing habits) are collected while shoppers are using the system are then made available as a service to catalog licensees, and advertisements are embedded within the catalog based on the target audience.

Further objectives and advantages of the invention will become apparent from consideration of the drawings and description that follows.

In accordance with the foregoing objectives, a catalog publishing system is disclosed for maintaining a master product database and providing for the multiple overlapping subsets of the information contained within the product database to be displayed to multiple concurrent users in a variety of formats. The system is composed of one or more centrally located or distributed databases which employ product masks that may be independent of the underlying structure of the data to support multiple views of the database, such that each view appears do be an independent catalog within itself.

Layered on top of the masking feature, a method creates a multiplicity of timeshared catalogs with multiple views that can act as multiple storefronts. The system further allows multiple pricing schedules for these electronic catalogs, and provides a means to integrate with other back-end and front-end systems.

Web catalog usage is billed in a variety of methods, including but not limited to a monthly fee, a pay-per-view arrangement, or a pay-per-transaction fee. License fees for compact disc (CD) and paper catalogs are calculated by the number of products in the particular subset catalog, and the number of copies produced.

DETAILED DESCRIPTION OF A PREFERRED EMBODIMENT

Figure 1:
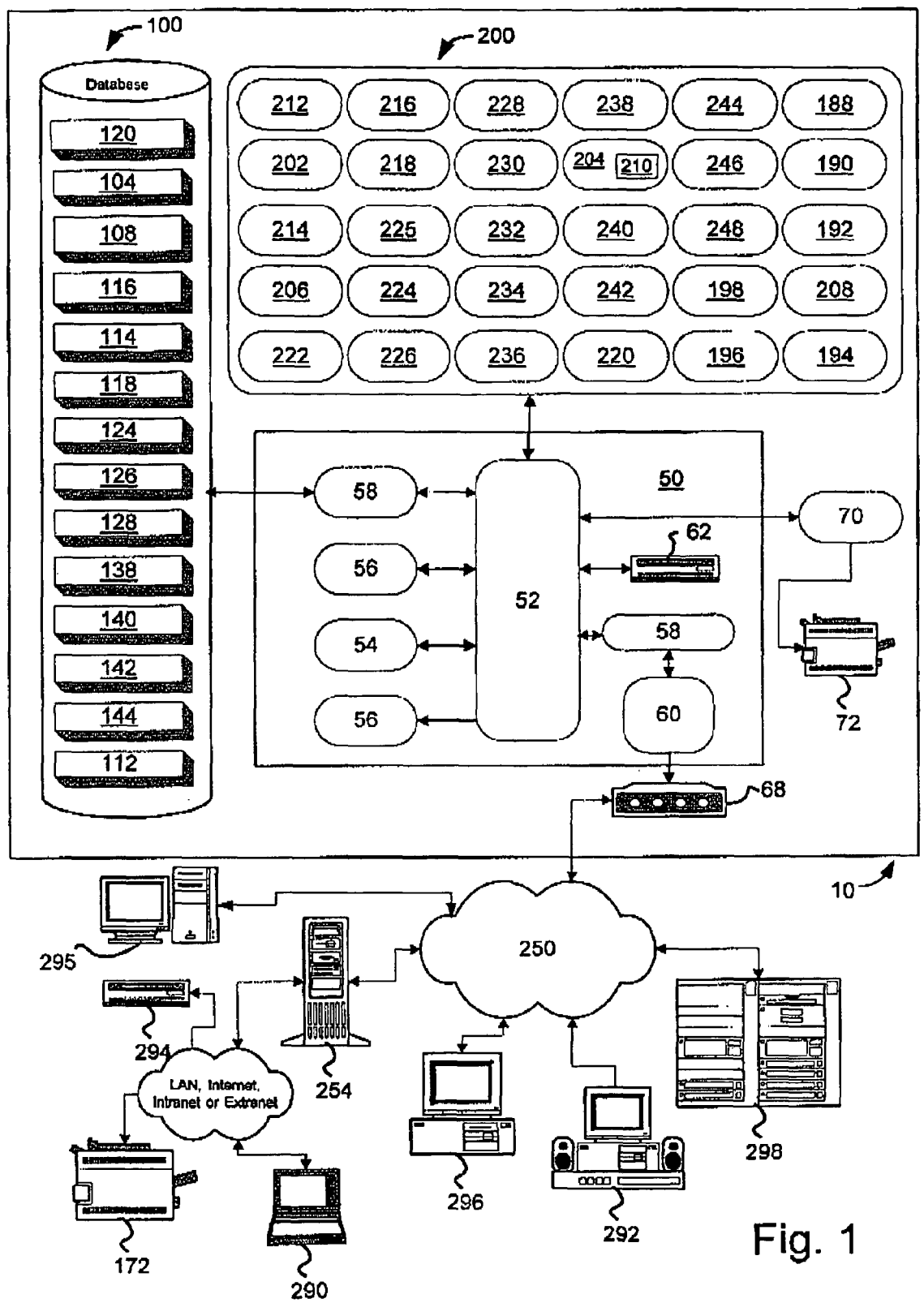
FIG. 1 is a block diagram illustrating major features of an embodiment of a system of the present invention.
Figure 2:
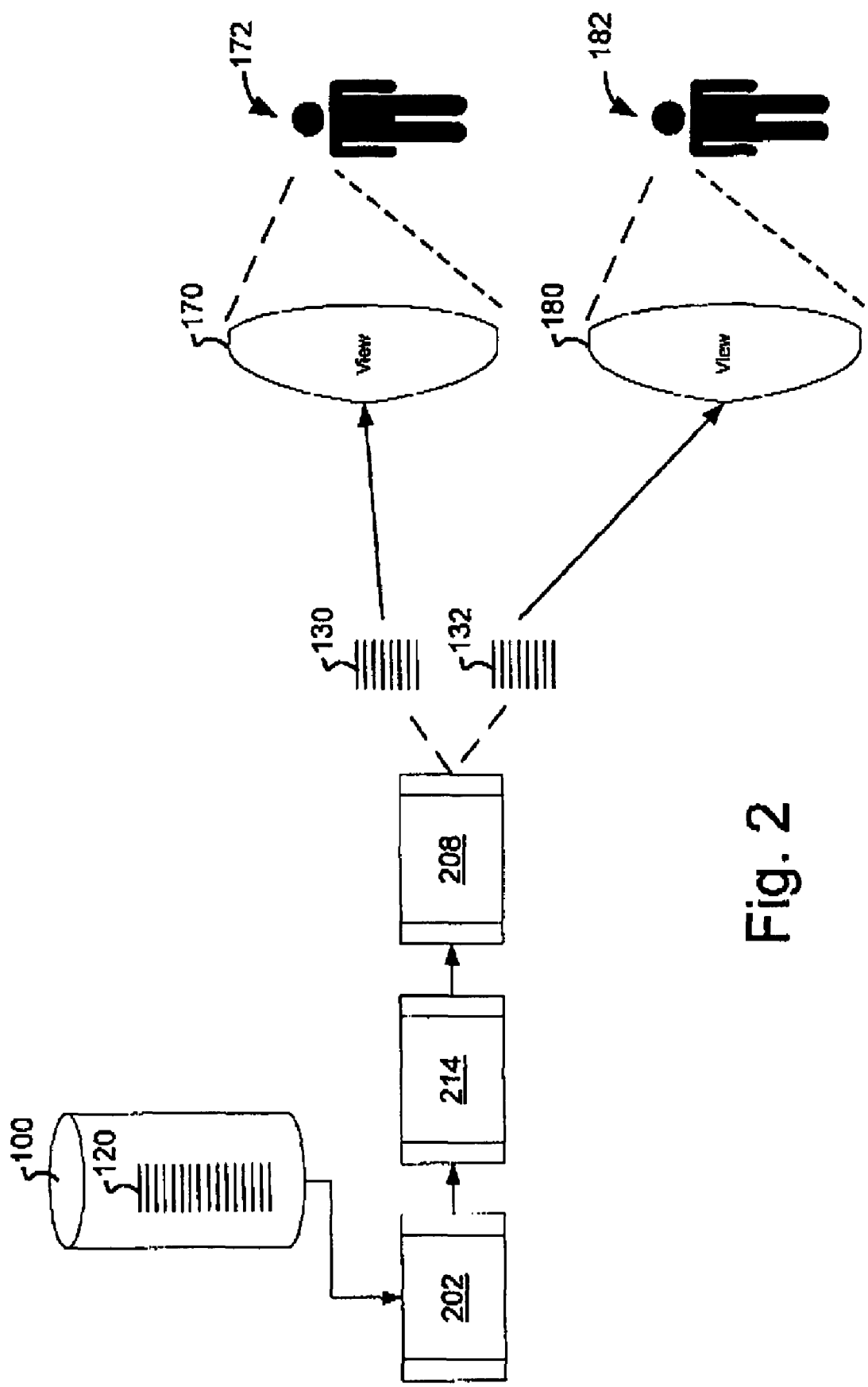
FIG. 2 is a data flow diagram illustrating masking functions of the system of FIG. 1 in more detail.

With reference to FIGS. 1 and 2, two block diagrams illustrating a system for providing a timeshared electronic catalog are shown. The system comprises an electronic database 100 having a plurality of data records which comprise a master data set (120 in FIG. 2). The system comprises at least a first and second subset (130 and 132 in FIG. 2) of the data records, wherein each subset 130-132 comprises one or more data records selected from the master data set 120. The system includes a software program 200 comprising a data record masking module 202 for selectively providing a first view (170 in FIG. 2) for displaying one of the subsets 130 to a first user (172 in FIG. 2).

Each of the plurality of data records 120 contains a plurality of data elements (110 in FIG. 3) which those skilled in the art would recognize as fields or attributes of the data records 120. Data elements 110 contains product information data. The data record masking module 202 is further for selecting the first user 172 to which the first view 170 is displayed.

The data record masking module 202 comprises a plurality of bit vector indices. The data record masking module 202 defines the first subset 130 by performing a bitwise AND operation between a first and second bit vector index. The first bit vector index defines all of the data records available in the master data set 202. The second bit vector index defines the data records in the first subset 130 that are presented in the first view 170.

The data record masking module 202 further defines which data elements 110 of the data records 120 in the first data subset 130 are displayed to the user. The data record masking module uses a third bit vector index for defining all of the data elements 110 that are available for presenting in each record in the master data set 120. The masking module further uses a fourth bit vector index for defining the data elements in the first data subset 130 to be displayed to the first user 130. The masking module 202 is further for performing a bitwise AND operation between the third and fourth bit vector indices.

The masking module 202 is further for providing a second view 180 for displaying the second subset 132 to a second user 182. The masking module defines the second subset 132 by performing a bitwise AND operation between the first and a fifth bit vector index. The fifth bit vector index defines the data records in the second subset 132.

The masking module 202 is further for defining which data elements 110 of the data records in the second data subset 132 are displayed to the second user 182. The masking module 202 performs a bitwise AND operation between the third and a sixth bit vector index for defining the data elements to be displayed to the second user. The sixth bit vector index defines the data elements 110 in each record in the second subset 132 to be presented.

The masking module 202 prevents the first user from accessing all of the data records in the second subset by limiting the first user to only those records defined by the second bit vector index.

As those skilled in the art would recognize from the discussion above, the masking module 202 may be for providing a plurality of views for each of the plurality of subsets. Each view is for presenting each respective subset to a plurality of respective users.

The electronic database 100 and software program 200 are stored on a server 10 connected to a network. The server comprises a computer system 50 having central processing unit (CPU) 52, read only memory (ROM) 54, random access memory 56, video driver and permanent storage device which those skilled in the art would recognize as typical parts of a computer system 50. The computer system 50 further includes a network stack 58 and communications interface 60, such as an Ethernet adapter, used for communicating with a network 250 which may comprise a local area network, the Internet, an intranet or an extranet. The computer system 50 may comprise a compact disc recorder 62 for added storage capability or for backup purposes. A firewall 68 may be electrically connected between the computer system 50 and the network 250 for added security.

One or more derivative processors 254 electrically connected to the network 250 may be used with the system. Each of the one or more derivative processors 254 may define one or more groups of one or more of the plurality users. The masking module 202 may define which of the subsets 130-132 of data records are available to each derivative processor 254 for display to each of the groups defined by the respective derivative processor 254.

The computer program 200 comprises a licensing module 204 for maintaining and modifying the data within each subset 130-132 based on a license granted to each respective user 172-182. The licensing module maintains and modifies the subsets available to each derivative processor 254 based on a respective license granted to each derivative processor 254.

The licensing module 204 further comprises a billing module 210 for billing the proprietors of each derivative processor 254 based the respective license. At least one of the licenses may provide for billing based on the number of times one or more data records 110 are presented to a user 172-182 of the respective derivative processor 254.

The computer program 200 may comprise a meta-data manager 206 comprising computer instructions that use a set of meta-data stored as part of the database 100 for formatting one or more of the data subsets 130-132 for presenting. The format defined by the set of meta-data 100 comprises style and other parameters for presenting the one or more data subsets 130-132.

A computer program 200 further comprises a feature manager, or masking, module 208. The computer program 200 executes executable features on the electronic database 100. The feature masking module 208 in the computer program 200 allows the first user 172 to execute at least a first executable feature, while preventing the first user from executing a second executable feature. The feature masking module 208 is further for allowing the second user 182 to execute the second executable feature. The feature masking module 208 is further for preventing the second user 182 from executing the first executable feature. The system may have a plurality of executable features for executing on the database 100. The feature masking module 208 allows a plurality of users 172-182 to execute one or more of the executable features. The feature masking module 208 defines which of the executable features are available to each derivative processor 254 for use by each of the groups defined by the respective derivative processor 254.

The licensing module 204 in the computer program maintains and modifies the features associated with each respective user 172-182. The licensing module 204 further maintains and modifies the features available to each derivative processor 254. The billing module 210 bills the proprietor of each respective derivative processor 254 based the license granted to the respective derivative processor 254. The billing module 210 may bill each proprietor of each derivative processor 254 based on the features available to the respective derivative processor 254. Further, the billing module 210 may bill based on the number of times one or more features are used.

The system of the present invention may function as an independent data processing, device or may be part of a network of shared data processing resources as shown in FIG. 1. The computer system 50 may range anywhere from the smallest micro computer system to one of the largest main frames and supercomputers, managed by a variety of operating systems, and may include optional ancillary hardware and software components.

The computer system 50 includes a computer having a central processing unit (CPU) 52, coupled to memory (RAM 56 and ROM 54) and to one or more permanent storage devices 58 (e.g. hard disks), and a display, such as a cathode ray tube (CRT) or liquid crystal display, as well as a keyboard and a cursor control device.

The computer program 200 is installed on computer system and controls its operation to facilitate the functionality provided by the present invention. The computer system 50 may also interface, either locally or remotely, to external software systems such as publishing software 70, which may in turn send output to local or remote printers 72. Certain elements within software communicate and store information in the database 100. The database 100 and its management software may be locally installed or be accessed via the computer network 250.

The computer program is further composed of a multitude of other modules, each of which performs specific functions. For example, a parametric search module 212 is used to quickly, accurately, intuitively and interactively locate and specify a set of records from among the set of those available in either the master catalog or any of its derivative catalogs, or subsets 130-132.

The field masking, or filter, module 214 selects which fields 110 are displayed in a derivative, or subset 130-132, catalog from among those available. Each catalog licensee may elect to select which fields 110 are displayed in their respective derivative catalog, and be billed accordingly. A dependency validator analyzes each subset catalog 130-132 for consistency and integrity, to ascertain that all required fields 110 and features are included in the catalog, and to eliminate the possibility of a field 110 (e.g. cross-reference field in product information) not existing in the same derivative catalog that includes a feature (e.g. the cross-reference module) that is dependant on that field 110. The feature masking filter module 208 controls which features are available for each derivative catalog, depending on the respective catalog licensee profile. Some of those features may include operation of a product comparison module 216 for comparing products in a subset 130-132, a fuzzy search module 218, or a cross reference manager module 220 described below.

A shopping cart module 222 such as that used with CATALOG MANAGER by A2i, Inc. of Los Angeles, Calif., AMAZON.COM of Seattle, Wash., or BUY.COM of Aliso Viejo, Calif., is included. Any catalog may include a shopping cart 222, into which shoppers may place items of interest for possible later purchase.

With the product comparison module 216, users may choose to compare the similarities and differences between a few selected products. Such a product comparison module 216 is sold with the CATALOG MANAGER by A2i, Inc. of Los Angeles, Calif.

The fuzzy search module 218 provides a method for searching that is based on non-precise definitions of the requested products, in a manner where similar matches will be included, and the result set can optionally be sorted by relevance. Such a fuzzy search module 218 may comprise the FUZZY DATA EXPLORER product by Metus Systems of Chapel Hill, N.C.

A free-text search module 225 allows users to enter text strings that are matched against the products' data fields 110 to produce a list of matching products. This all in one approach parses and matches the user's entry to categories, product and manufacturers' names, as well as attribute names and values. Such a free text search module 225 is sold with the CATALOG MANAGER by A2i, Inc. of Los Angeles, Calif.

Licensee-customized catalog prices are handled via a custom pricing engine 224, which provides each derivative server 254 with prices that are based on those uploaded by the respective subset licensee. The customer pricing engine may be derived from the ONE-TO-ONE product sold by Broadvision, Inc. of Redwood City, Calif.

A related items locator module 226 provides functionality to display other products that are related to a product. Such a related items locator module 226 is sold with the CATALOG MANAGER by A2i, Inc. of Los Angeles, Calif.

A catalog versioning engine 228 handles the display different versions of a subset catalog, which may differ in text language and/or other criteria. The catalog version engine 228 may comprise any number of electronic language translation systems know to those skilled in the art.

A print publication interface module 230 provides the required functionality to interface to hardware and software that is used to generate printed versions of a catalog. The print publication interface module 230 may comprise an interface with the QUARKXPRESS product by Quark, Inc. of Denver, Colo., to present catalog subsets 130-132 in paper form.

A web catalog interface module 232 provides the required functionality to interface to hardware and software that is used to generate electronic versions of a catalog that are transmitted to catalog users 172-182 through the computer network 250 such as the Internet. The web catalog interface module 232 may interface with the INTERNET INFORMATION SERVER by the Mircrosoft Corp. of Redmond, Wash. to produce the electronic catalogs.

A CD catalog interface 234 provides the required functionality to interface to hardware and software that is used to generate electronic versions of a catalog that are standalone programs residing on non volatile storage means (e.g. CD, DVD, etc.). The CD catalog interface module 234 may comprise the HYCD product by HyCD, Inc. of San Jose, Calif.

A similar item locator module 236 allows users to search and find items that are similar to a selected set of items. The similar item locator module 236 may be found in the CATALOG MANAGER product by A2i, Inc. of Los Angeles, Calif.

The system is managed though an administrative interface module 238, which provides the required functionality to manage the catalog subsets 130-132 and other subsystems. Such an administrative interface module 238 may be found in the CATALOG MANAGER product by A2i, Inc. of Los Angeles, Calif.

The catalog license module 204 further allows catalog licensees to manage their derivative catalog, as well as to query their account information, statistics and other related data.

A profile manager module 240 maintains and provides personalization information about catalog shoppers, which may include data related to their browsing habits, geographic location, and other such information that is used to generate targeted content and advertisements. The profile manager module 240 may comprise the ONE-TO-ONE COMMERCE product by Broadvision, Inc. of Redwood City, Calif.

The electronic commerce interface module 242 communicates with electronic commerce systems (either internal or external) and allows for order information to be submitted, tracked, and queried. The electronic commerce interface module 242 may comprise the ONE-TO-ONE COMMERCE product by Broadvision, Inc. of Redwood City, Calif.

The cross reference manager module 220 is used to match product specifications across different manufacturers and product lines, to provide for search and display of products with similar characteristics from different sources. Such a cross reference manager module 220 may be found in the CATALOG MANAGER product by A2i, Inc. of Los Angeles, Calif.

Manufacturers may add and update their product records as well as query and view statistical information relating to their business via a manufacturer interface 244. Such a manufacturer interface 244 may be found in the CATALOG MANAGER product by A2i, Inc. of Los Angeles, Calif.

Communications with remote or derivative servers 254 is handled via a remote server interface module 246, which provides both information push and pull services from remote servers. The exchange of information includes such items as product information, billing data, history and usage logs. Such a server interface module 246 may be found in the MICROSOFT SITE SERVER by the Microsoft Corp. of Redmond, Wash.

Statistics on catalog subset usage are collected using a usage statistics tracking module 248 which detects and collects data such as record view usage, feature usage and other data that can be used in statistical, analytical, billing and other data collection processes to be stored in the usage history and statistics database entity 114. Such a statistics tracking module 248 may be found in the WEBTRENDS product by the WebTrends, Corp. of Portland, Oreg.

Catalog shopper actions are collected and stored by a usage and statistics tracker module 248. As one skilled in the art would appreciated, such collection of data can be accomplished by reading the web or catalog server's log files.

A security manager module 198 controls all operations of the system by allowing only authorized entities to perform only the approved operations and view the data that they are allowed. Such a security manager module 198 may be found in the CATALOG MANAGER product by A2i, Inc. of Los Angeles, Calif.

Advertisements and promotions that are displayed to catalog shoppers while using the system are controlled by the advertisement and promotions manager module 196. Module 196 may be implemented with the MICROSOFT AD SERVER by the Microsoft Corp. of Redmond, Wash.

An image manager 194 is used to import, manipulate and link images to items and metadata within the database. Such an image manager 194 may be found in the CATALOG MANAGER product by A2i, Inc. of Los Angeles, Calif.

A feature manager module 192 is used to specify and control which features from among the set available, for example cross reference, fuzzy search, or product comparisons, are permissible to users 172-182 of a catalog. Operation of the feature manager module 192 works in conjunction with the feature masking module 214 explained in more detail below.

Product cross and up-sells are handled by a cross and up selling engine module 190, which dynamically tailors a user's 172-182 display to include cross- and/or up-sell item offers. Module 190 may be implemented using the ONE-TO-ONE COMMERCE product by Broadvision, Inc. of Redwood City, Calif.

Discounts that may apply to specific products are calculated by a discount engine 188. This module dynamically calculates (using rules and information from the master database 120 and/or licensee-customized rules and data) the discounted price and displays it on the users' screens during their catalog shopping session. Module 188 may be implemented using the ONE-TO-ONE COMMERCE product by Broadvision, Inc. of Redwood City, Calif.

As stated above, the various software modules in the computer program 200 communicate with one or more databases 100. The database 100 may comprise one or more database management systems that handle multiple databases, each with a multitude of tables, associated indexes, stored procedures, external files and references as required to provide the functionality required by each of the above discussed modules separately and of them all as a whole. In this context, the database entities below encompass tables, indexes, stored procedures, external files and references, and whatever other data and structures may be required.

Figure 3:
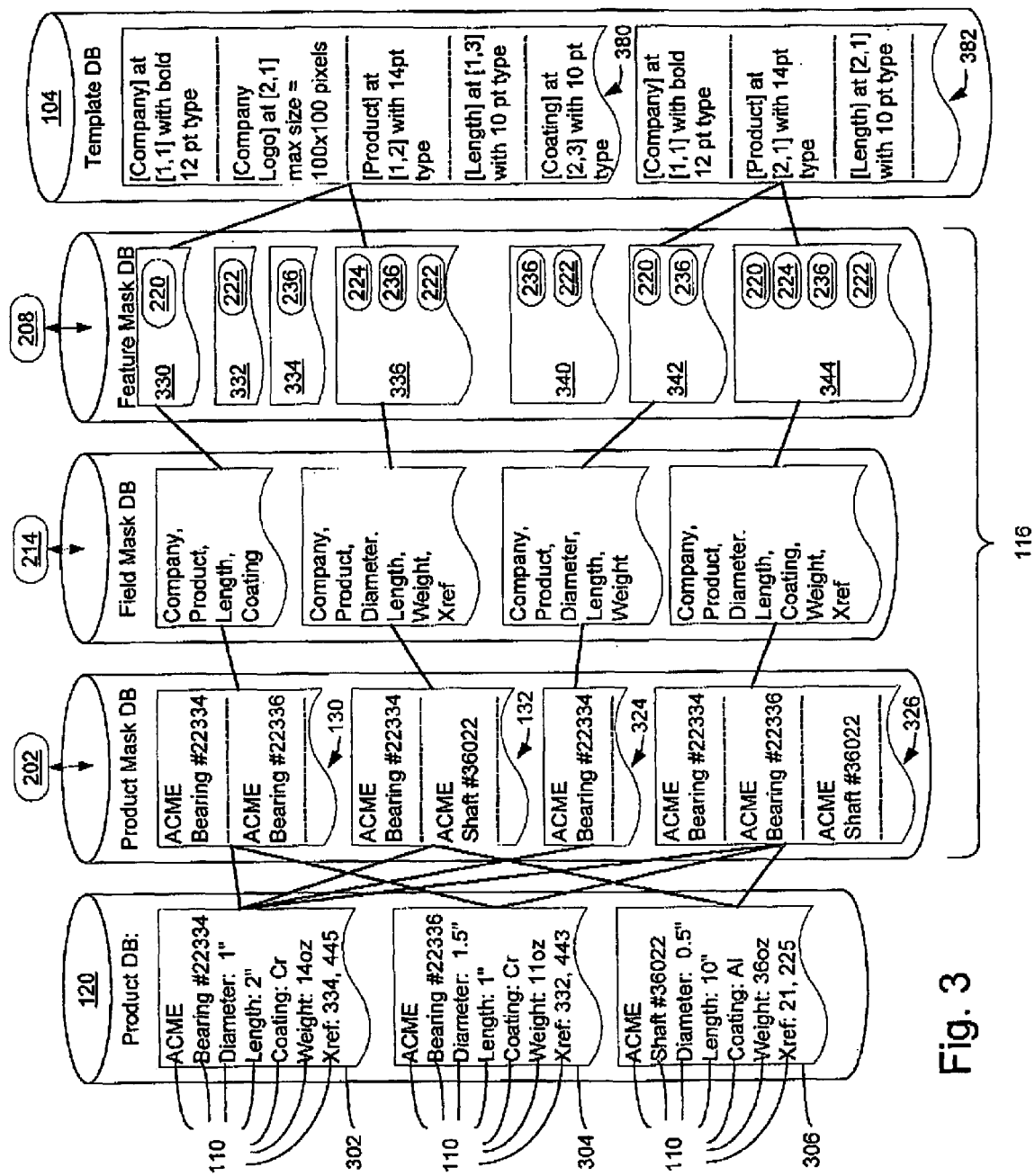
FIG. 3 is a data flow diagram illustrating exemplary masking functions and template implementation of the system of FIG. 1.

A product catalog database entity 120 is the master product catalog that stores information related to product characteristics, as well as manufacturer, price, distribution methods, packaging, and hazardous material status in data records (302-306 in FIG. 3).

A metadata database entity 104 contains data associated with products, category hierarchy placement, taxonomy information, template association, and other such information that is related to the function and presentation of the product data records 302-306 and catalog layout. The metadata database entity 104 also includes granular instances of field lists, priority rankings and initial tolerance and accuracy values for the cross reference module 220 and similar item locator module 226.

A licensee profiles database entity 108 stores information related to each and all of the catalog licensees that have licensed custom dynamic-partitioned catalog subsets from the master data set 120. Information stored in the license profiles database entity 108 includes: contact information, custom price lists, custom descriptions for products, links to custom templates, as well as links and references to record masks stored in a dynamic partitioning database entity 116, field masks stored in the dynamic partitioning database entity 116, feature masks stored in the dynamic partitioning database entity 116, billing and accounting data in a billing and accounting database entity 112, statistical data stored in a usage history and statistics database entity 114, history and usage logs stored in the usage history and statistics database entity 114, discount data or other attributes.

A dynamic partitioning database entity 116 stores information that is required for the dynamic partitioning functionality of the catalog master database 120. Among the data stored in the dynamic partitioning database entity 116 are product masks, field masks, feature masks, and the relational dependencies between products, fields and features.

The usage history and statistics database entity 114 stores a record of all actions performed by users of the catalog site, such that these records may be subsequently used to generate both aggregate and focus reports, for tracking, statistical and security uses.

A customization information database entity 118 contains information that is required to support catalog licensee customization features for dynamic catalogs. Data stored includes licensee-configured custom template information and references, logos and other images, as well as custom prices, templates and discount pricing data.

The advertising database entity 124 stores information that is used to dynamically displayed targeted advertisement content to catalog shoppers during their use of the catalog system. The advertising database entity 124 also includes information for advertisement effectiveness (gathered from impression and click-through ratio) that is used for reporting purposes.

A promotion database entity 126 stores information related to the display and proposition of promotions, such as product cross- and up-sells, in a manner where different licensees can customize their catalog to display custom promotions and specials.

A discount information database entity 128 stores information related to the application and computation of discounts for products purchased by catalog shoppers on the Web site.

A transaction log database entity 138 stores a log of all transactions facilitated by the catalog system, including product purchases, licensee payments, advertising revenue, and other transactions.

A template and presentation database entity 140 stores graphical elements, computer instructions, presentation specifications and metadata references required to dynamically populate licensee-selected templates with product data, while incorporating additional presentation directives.

A security data and logs database entity 142 stores access control lists for each known entity and every operation that can be performed on the system. The security data and logs database entity 142 also tracks and stores log of all data access, updates, manipulations and operations that were performed by users of the system, including all violation attempts and other unauthorized actions.

A billing and accounting database entity 112 stores information related to customer and licensee billing, accounting data, and other information used for billing transactions and system usage.

A catalog shopper profiles database entity 144 stores individual profiles for each of the catalog users that browses any derivative catalog. Among the information stored in the catalog shopper profiles database entity 144 is account information such as contact info, credit and balance information, as well as purchase history; personalization data and user settings; and bookmarks for selected areas of the catalog.

Database management in the system is prosecuted by a commercial relational database management system (RDBMS) such as ORACLE8i Release 2 by Oracle Corp. of Redwood Shores, Calif. or MICROSOFT SQL SERVER by The Microsoft Corp. of Bellevue, Wash. The present invention abstracts the actual implementation from the underlying hardware and software used to manipulate the database 100.

Partitioning, or subset, management is handled via the data record masking module 202, field masking module 214 and feature masking module 208 which create, update and store masks, or subsets 130-132, and associate the subsets 130-132 with catalog licensee profiles stored in the catalog licensee profiles database entity 108. The modules 202, 214 and 208 define which records, fields and features are to be made available to the catalog licensee from among the set of subsets 130-132 available in the master catalog 120.

Part of the invention can be described as a timeshared derivative catalog as subset 130-132 of the master catalog 120 that is generated in real-time, using the dynamic partition filtering software components 202, 214 and 208. These components read the appropriate information from the catalog licensee's profile stored in the licensee profile database entity 108, retrieves the associated masks that the licensee's profile defines, and uses them to filter information contained in the master catalog 120. The result is a dynamically-generated catalog 130-132 that contains only the products, features and fields 110 that are subscribed to by the catalog licensee.

Catalog licensees are able to customize their derivative catalogs 130-132. For example, the following capabilities may be offered:
 selection of products in subset catalog 130-132;
 upload of price lists;
 upload of customized logo and contact information;
 upload and association of customized fields;
 upload and association of customized templates; and
 account status display.

Electronic catalogs (both standalone and network-based) have the option to gather statistics about usage, browsing habits, and purchase patterns. Network catalog statistics are directly stored in the usage history and statistics database entity 114. Information from standalone catalogs may be transferred through manual or automatic processes from individual users to the main repository.

Parties interested in licensing a derivative catalog are offered the option of registering with the catalog provider. Registration can occur in any number of ways, including via online, batch upload or other means. An online registration form is provided for entry of contact and billing information. Item, feature and field selection are then accomplished through online interfaces. Large amounts of new catalog licensees can also be entered via a batch upload process. This technique is primarily useful for franchises or other chain-supply organizations. For example, all participating outlets can be subscribed to the system, yet each display their own customized derivative catalog 130-132. Finally, other means, such as fax, phone and mail forms can be used to subscribe for a derivative catalog 130-132.

The catalog system described with respect to the present invention is able interface to other computer systems via the electronic commerce interface module 242. This module 242 contains electronic commerce related procedures such as order entry, inventory confirmation, and shipment tracking. In addition, the system supports the use of standardized protocols such as EDI for electronic commerce applications and integration with external business systems.

Standalone electronic catalogs that are stored on local media comprise catalog instructions, catalog data, a catalog application and dynamic network-based update. The catalog instructions are catalog-specific, platform-independent and machine readable instructions that control the presentation, behavior and functionality of a specific catalog. The catalog data includes product data, metadata and supplementary information that is output to the user on a local display device. The catalog application comprises a generic application program that acts as a catalog interpreter to merge catalog instructions and functionality with catalog data for display on the user's computer screen. Electronic catalogs stored on local storage media such as hard disks, CD-ROM and DVD can receive updates through a computer network and store those updates locally. When the catalog is displayed, updated information will be displayed when available, with existing catalog data displayed elsewhere.

With reference to FIG. 3, an example partitioning of the master product catalog 120 is shown. The master or product catalog 120 is made available as multiple dynamically partitioned catalogs 130, 132, 324 and 326 in a way that each derivative partitioned catalog 130, 132, 324 and 326 has only a pre-specified one of subsets (130, 132, 324 or 326) of records 102-106, fields 110 and access to features, e.g. 220, 222, 224 and 236. The process is made possible by use of a masking function. The masking function comprises the filter modules 202, 214 and 208 that allow the passing of records, fields and features to which a specific catalog licensee has subscribed.

Catalog data exists in the master or product catalog 120, which is then partitioned to produce subsets 130, 132 and 324 and 326 containing only the product records, fields and features that the subscriber has paid for. In the example in FIG. 3 information regarding bearing and shafts may be selectively included in derivative catalogs 130, 132, 324 and 326. Three of a plurality of data records stored in the master product catalog 120 are shown. Through a bit vector indexing process described below, the data record masking module 202 partitions the master product catalog 120 according to product masks stored in data entity 116 into subsets 130, 132, 324 and 326. Next, with the bit vector indexing process, a field masking module 214 determines which fields 110 are to be displayed for each subset according to field masks stored in data entity 116. With the bit masking process, the feature masking module 208 determines which features of the computer program 200 are available according to feature masks 330, 332, 334, 336, 340 342 and 344. Each feature mask defines a subset of available features that are available for that particular feature mask as illustrated. For example, feature mask 340 (not used by any of the subsets in this example) allows use of features 236 and 222 in computer program 200.

The computer program 200 will select one of a plurality of templates 380-382 stored in the template and presentation database entity 140 according to related template pointers stored in the metadata database entity 104. The module in the computer program 200 that prosecutes selection of the template depends on the kind of output for the specific subset. For example, if the subset is for producing a printed catalog, then the template is selected for printing on the local printer 72 or a remote printer (272 in FIG. 1), and instructions for printing reside in the print publication interface module 230. If the subset is for producing an electronic catalog on the world-wide-web, intranet, or Internet (web catalog), then an HTML, XML, or other web compatible template is selected for presentation of the subset on the local printer terminal or a remote one of a plurality of remote terminals (290-292 in FIG. 1), and instructions for electronic presentation reside in the web catalog interface module 232. If the subset is for producing an electronic catalog on a compact disc (CD) then a CD compatible template is selected for presentation of the subset on the local CD recorder 62 or a remote CD recorder (294 in FIG. 1), and instructions for electronic presentation reside in the CD catalog generator module 234.

Figure 4:
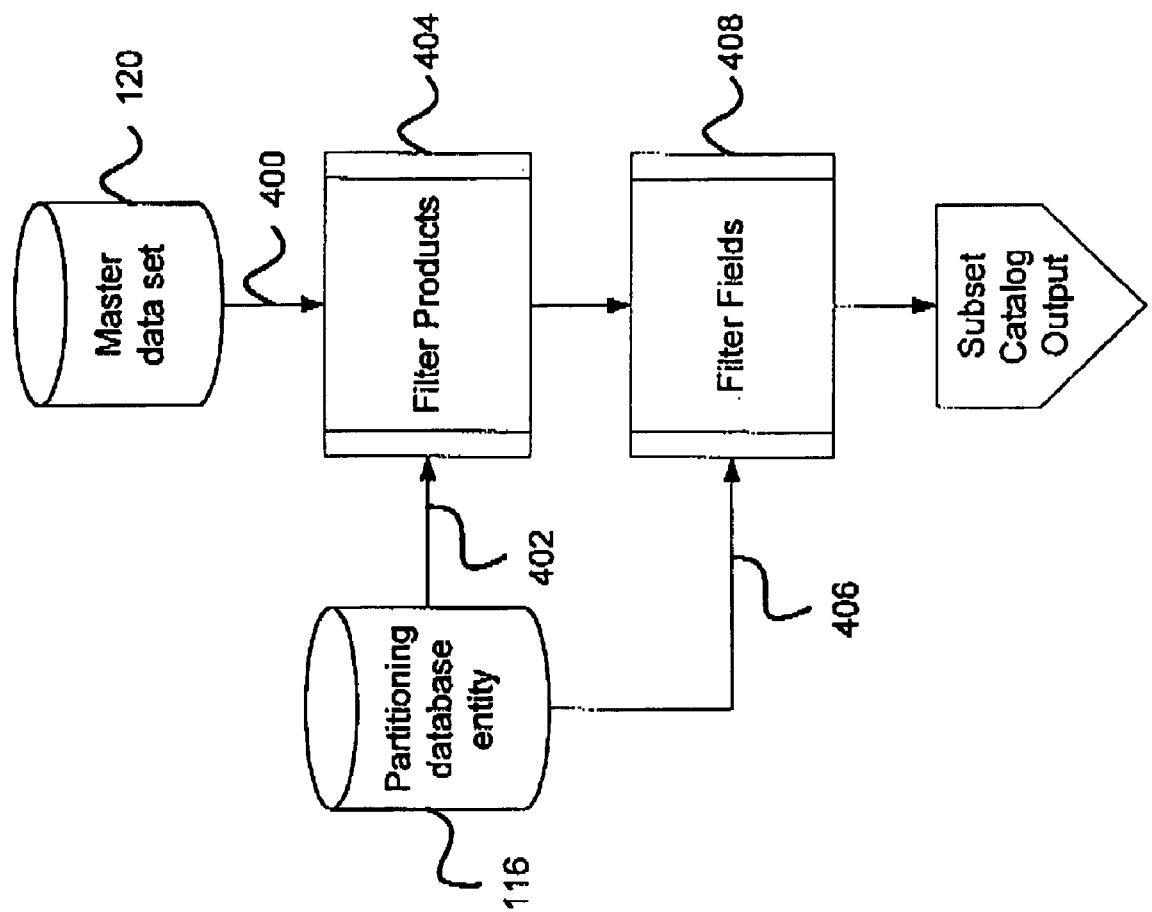
FIGS. 4-5 are flow diagrams illustrating the process by which a derivative catalog is created through bit vector index masking for any of the output formats supported by the system of FIG. 1.
Figure 5:
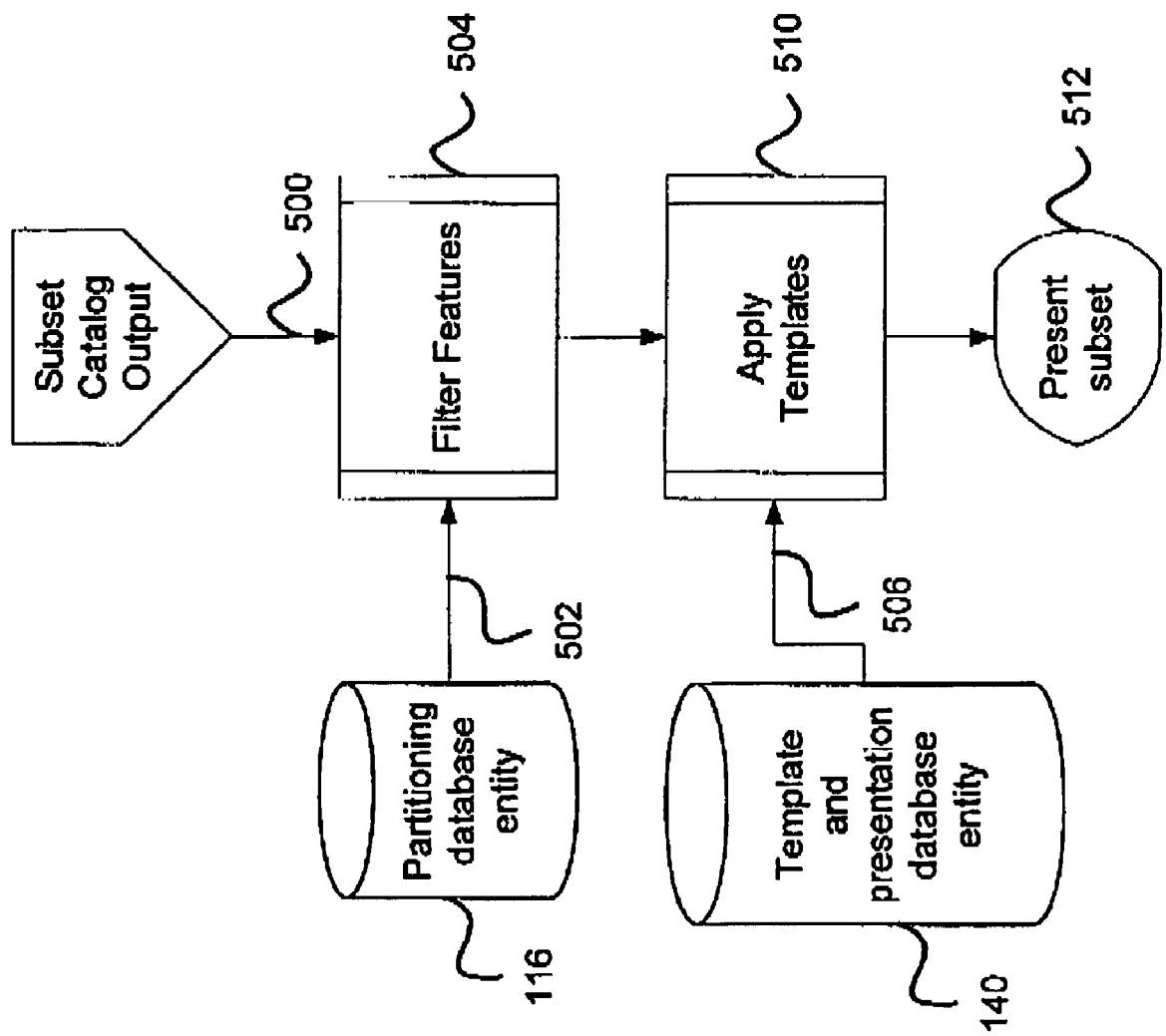

With reference to FIGS. 4-5, flow diagrams illustrating the process by which a derivative catalog is created through bit vector index (BVI) masking for any of the supported output formats is shown. The master catalog 120 contains all available product information, also linked to the metadata database entity 104. The administrative interface 238 is used by catalog administrators and licensees (by a proxy or administrative terminal 296 in FIG. 1) to indicate which product records 102-106, features in computer program 200 and data fields 110 are to be included in each licensee profile, or subset. Appropriate masks are then read from the dynamic partitioning database entity 116. Billing information for the selections is stored in the billing and accounting database entity 112.

When a derivative catalog 130 is output, either electronically or to a static medium, the dynamic partitioning database entity 116 is queried by the product, field and feature mask filters (202, 214 and 208 respectively) to determine what information will be included within the derivative catalog (e.g. 130). Derivative catalogs 130 may be either static or dynamic. Static catalogs are those that are created by a one time masking operation, and then independently exist on static media, such as paper or CD-ROM. Dynamic catalogs are created in real-time for each user 172-182 of each subset catalog 130, 132, 324, 326 from the master database 120, based on interactive response to user actions, and filtered in real time to include only items contained within the derivative catalog 130 being browsed by the user.

The product, field and feature mask filter modules 202, 214 and 208 preferably each use an improved bit vector indexing solution to augment otherwise typical database indexing to define the product subsets 130-132, and fields and features available therein. The product mask module 202 creates one or more bit vector indexes (BVIs) for each subset 130-132. A first BVI is for identifying records available in the master data set 120. A second BVI defines the records available in the subset 130-132. The product masking module 202 performs a bitwise AND operation between the first and second BVIs to define the records available in the subset 130-132. Similarly, a third BVI defines the fields (110 in FIG. 3) available in each record in the master data set 120. The field masking module 214 uses a forth BVI to define the fields 110 available in the subset 130-132, wherein a bitwise AND operation is performed between the third and forth BVIs to so define the available fields. Similarly, the feature masking module includes a fifth BVI for defining available features in the software program 200 for operation on data sets 130-132. A sixth BVI defines the features available for each dataset 130-132. The feature masking module 208 performs a bitwise AND between the fifth and sixth BVIs to so define the features in the dataset 130-132.

Each BVI comprises a plurality of bit vectors. Each bit vector in a BVI identifies the availability of a record, field or feature that corresponds to the bit vector. The bit value for the particular bit vector is set to on, or to 1, if the particular product, field or feature is made available. A collection of bit vectors defining the available products, fields or features comprises the BVI for matching in column pair with a subset's BVI by performing the aforementioned bitwise AND operation to define availability in a subset.

Defining subsets 130-132 and thereby masking records, fields and features, and searching lookup fields based on lookup values is dramatically faster using BVIs than a traditional indices because all that is necessary to identify the set of records in the master product set 120 that correspond to a particular value in the lookup table is to extract the bit vector for that value from the BVI for the lookup table; the bits that are set in the bit vectors immediately identify the set of records. Using this approach, the time required to identify the set of records having a particular value in a lookup field grows linearly rather than geometrically with the number of records, as well as linearly rather than exponentially with the number of tables.

In addition, handling multiple constraints on a single lookup field is just as straightforward. The bit vectors for each of the values constraining the single lookup field are simply bitwise-ORed together; any bit that is set in the resulting bit vector indicates that the corresponding record should be included in the result set.

BVIs and bit vectors have a number of other advantages. First, at one bit per record in the master data set 120 for bit vectors as opposed to a minimum of eight bytes per record for an traditional index, a bit vector is substantially smaller than a corresponding index. This means it can be processed faster, requires less memory, is not as likely to need to be stored on disk, and if it is, requires that less data be accessed on the disk for a particular operation. An additional improvement is to encode sparse bit vectors to further reduce the amount of storage they require. Various encoding schemes that are used include enumeration, run-length encoding, truncation of leading and trailing zeros, and LZW compression, as well as additional compression over the entire BVI.

Second, BVIs solve the problem of constraints on multiple fields. Instead of complex algorithms reconciling individual sets of query results to combine the multiple constraints, the corresponding BVI operation is again straightforward and much faster. After the bit vectors for multiple values constraining a single lookup field are first bitwise-ORed, the resulting bit vectors for each of the lookup fields are then bitwise-ANDed. Unlike the geometric time required to reconcile individual result sets, the time grows linearly with the number of records in the primary table.

Third, BVIs solve the problem of interactive browsing. Since the subset 130-132 of records is known immediately—it corresponds to the bit vector that results from the bitwise-ORs and -ANDs—no temporary file of query results needs to be created for a subset 120, the records themselves do not need to be accessed in advance, and each particular record 110 is accessed only when it is browsed into view, if ever.

Fourth, BVIs reduce the repeated overhead when performing interactive, iterative queries. Intermediate resulting bit vectors can be stored for each lookup field during the course of an iterative query. Additional constraints can then be applied to them rather than reapplying all of the constraints from scratch using the original bit vectors of the BVIs.

Finally, BVIs are perfectly suited for value limiting across multiple lookup tables and completely eliminate the need to perform complex multi-table joins. To perform value limiting on a particular lookup field, the system ignores the constraints on that field and generates the intermediate result bit vector for the remaining constraints on all of the other lookup fields. The system then performs a logical-AND between the intermediate result bit vector and each bit vector in the BVI for that lookup field; any value for which the result of the logical-AND is FALSE should be eliminated from the value-limited list. Note that a logical-AND returns only a single value of TRUE or FALSE and does not always require that all the bits in the vector be compared; the comparison can stop as soon as one pair of bits are found to both be set. Ignoring the constraints on the lookup field being value limited is done so that the next iterative query can change the constraints on a particular lookup field based on all the values for which records exist in the primary table, not just the values already selected as constraints.

In order to illustrate the use of BVIs, the following sample database will be used:

| Master Data Set 120 | | | |
|---|---|---|---|
| ID | Description | Manufacturer | Category |
| 1 | ACME Printer | 1 | 1 |
| 2 | ACME Computer | 1 | 2 |
| 3 | Apex Computer | 2 | 2 |
| 4 | Best Printer | 3 | 1 |
| 5 | Apex Monitor | 2 | 3 |

| Manufacturers Table | |
|---|---|
| ID | Manufacturer |
| 1 | ACME |
| 2 | Apex |
| 3 | Best |

| Categories Table | |
|---|---|
| ID | Category |
| 1 | Printers |
| 2 | Computers |
| 3 | Monitors |

Since there are two lookup fields on the primary table, two BVIs are needed—one for the manufacturers and one for the categories:

| Manufacturers BVI | |
|---|---|
| Bit vector for ID = 1 (ACME) | 1 1 0 0 0 |
| Bit vector for ID = 2 (Apex) | 0 0 1 0 1 |
| Bit vector for ID = 3 (Best) | 0 0 0 1 0 |

| Categories BVI | |
|---|---|
| Bit vector for ID = 1 (Printers) | 1 0 0 1 0 |
| Bit vector for ID = 2 (Computers) | 0 1 1 0 0 |
| Bit vector for ID = 3 (Monitors) | 0 0 0 0 1 |

Consider the search query=Manufacturer=Apex denoting that the subset 130 should only display records wherein the Manufacturer=Apex. To find the resulting records in the master data set, the product mask module 202 extracts the bit vector corresponding to Apex from the Manufacturers BVI. The bit vector is [00101], and indicates that the records from the primary table with ID=3 (since the third bit is set) and ID=5 (since the fifth bit is set) comprise the result subset 130.

Consider the search Manufacturer=ACME OR Manufacturer=Best to define another subset 132. To find the resulting records 110 in the master data set 120, the product masking module 202 extracts the bit vectors corresponding to both ACME and Best from the Manufacturers BVI and bitwise-ORs them together. Theses bit vectors are [11000] and [00010] respectively, and the bit vector that results from the bitwise-OR operation is [11010]. This indicates that the records from the primary table with ID=1, 2 or 4 comprise the resulting subset 132.

Consider the search Manufacturer=ACME AND Category=Computers to define yet another subset. To find the resulting records 110 in the master data set 120, the product masking module 202 extracts the bit vector for ACME from the Manufacturers BVI and the bit vector for Computers from the Categories BVI. These bit vectors are [11000] and [01100] respectively, and the bit vector that results from the bitwise-AND operation is [01000]. This indicates that the record from the primary table with ID=2 comprises the result subset.

Now consider the above search for value limiting. To find the valid manufacturers, the product masking module 202 generates the result bit vector while ignoring the constraints on Manufacturers. In this case, module 202 simply defines the bit vector for Computers from the Categories BVI which is [01100]. The product masking module 202 performs a logical-AND this with each of the bit vectors in the Manufacturer BVI. This is TRUE for ID=1 (bit vector is [11000]) since both have the second bit set. Similarly, this is TRUE for ID=2 (bit vector is [00101]) since both have the third bit set. However, ID=3 (bit vector is [00001]) has no bits in common and is therefore FALSE. Thus the value limited set of manufacturers is ACME (ID=1) and Apex (ID=2). A validation check of the data will reveal that the only manufacturers with computer products are indeed ACME and Apex. Similarly, to find the valid categories, the product masking module 202 generates the result bit vector while ignoring the Category constraints. In this case, this is simply the ACME bit vector from the Manufacturers BVI which is [11000]. The product masking module 202 performs a logical-AND between this bit vector with each of the bit vectors from the Categories BVI. This is TRUE for ID=1 ([10010]) and ID=2 ([01100]); but FALSE for ID=3 ([00001]). Thus the valid categories are Printers and Computers.

The use of BVIs with the system of the present invention provides: (a) the ability to use BVIs to access data stored in a relational DBMS; (b) the ability to maintain BVIs against a DBMS, updateable by authorized users, rather than one that is read-only; (c) use of the BVIs for value limiting; (d) more efficient storage and encoding of BVIs for large databases; and (e) enable efficient parametric searching in the master data set 120 or derivative catalogs 130-132.

Referring back to FIG. 3, a derivative catalog or subset can exist in a variety of formats, including but not limited to: paper or electronic, with electronic instances being either permanent storage (e.g. hard disk, CD-ROM, DVD, etc.) or interactive (e.g. accessible via the Internet or other computer network). A derivative catalog may be generated for the paper medium. The output from the process in FIG. 3 is associated with template information and then programmatically placed within a commercial, third party desktop publishing program. Page layouts that exist within the layout program may then be printed out to paper or further customized. The invention retains graphical modifications for application in future population procedures. Also provided is a mechanism for data modifications performed in the layout program to be tracked and propagated back into the master catalog or any of its derivative catalogs.

The template instructions 104 specify how to sequence, format, position and style each field of information for each record. The templates 140 contain directives to adjust the template's formatting based on its location within the output page or display, which are used when the shape of a template's bounding box must be changed. Templates may include instructions on how to position and display images that may be associated with a particular product, field, attribute, category, or any other data in the catalog.

The following is an example of template instructions for formatting catalog output on a computer screen using the HTML language:

```
<html>
<TITLE>ACME Interactive Catalog</TITLE>
<IMAGEFIELDS>
    <p align = center> <IMG SRC= <IMAGEFIELDIMAGE> > </p>
</IMAGEFIELDS>
<table align = center width = 400>
    <TEXTFIELDS>
        <tr valign = top>
        <td width = 118>
        <font face="Verdana,Arial,sans-serif" size=–2>
        <b> <TEXTFIELDNAME> </b>
        </font>
        </td>
        <td> <font face="Verdana,Arial,sans-serif" size=–2>
        <TEXTFIELDTEXT>
        <BR> </font> </td>
        </tr>
    </TEXTFIELDS>
</table>
</body>
</html>
```

The example above shows how text and image fields are populated in real time from catalog data. The marker <IMAGEFIELDIMAGE> is substituted with a product's image. The product's attribute data is displayed by repeating the code block delineated by <TEXTFIELDS> and to generate a table with field names and field values. The <TEXTFIELDNAME> tag is replaced with the field name of the product's attribute data, and the <TEXTFIELDTEXT> marker is replaced with the corresponding field value.

When a static derivative electronic catalog 130 is created, initially, catalog data is transferred to a static storage medium and a graphical user interface is designed for the catalog, with placeholders for data. Then, data sources from the catalog are linked to various elements in the design, such as picklists, product information tables, etc. Finally, a standalone catalog is produced by encapsulating the data and graphical design into machine-readable computer instructions.

The output of the system may comprise a network-based electronic catalog that is accessible to multiple concurrent users. The data for a network-based catalog resides in the master catalog database 120, and is dynamically masked by the system to include only the products, fields 110 and features that are to be included in the derivative catalog 130. The graphic and functional presentation of the catalog is controlled via a server-side application (module 232 which may comprise HTML, ASP or JavaScript) that contains graphical and functional interface elements. Product information and metadata is passed to the web server computer program 200 via a communications interface 58-60, and the combined result is sent to the user's via the network 250. An interface to external systems may be provided, to allow the web server software (as controlled by the server-side application 200) to interface to external systems such as electronic commerce systems, customer business systems or other manufacturer/distributor operational systems (298 in FIG. 1). Statistics and billing for catalog usage by network users are accumulated and stored in database entity 114.

The master catalog 120 contains the full repository of products, any of which may be selected for inclusion in a derivative catalog 130, 132 324, or 326. Product selection may be accomplished by means such as the parametric search module 212, upload of SKU or UPC number lists or selection wizards. Catalog licensees are able to use the parametric search module 212 to select products to be included in the derivative catalog 130. Multiple searches may be performed, with the results from each accumulating in the licensee profile database entity 108. The system allows catalog licensees to upload a list of item identifiers (including, but not limited to: UPC, SKU number, manufacturer part number, etc.) that are matched to products in the master catalog 120, with matching products included in that licensee's profile in the licensee profile database entity 108. Products of interest may be associated to catalog licensee profiles through the use of guided selection screens, or selection wizards. These user-friendly screens are used by catalog licensees to interactively select products for inclusion in their profiles. The selection process using selection wizards occurs by using picklists and check boxes to indicate selections of products, categories and manufacturers.

Catalog licensees can select how their derivative catalog will be presented, by either choosing among a set of pre-existing formats, or creating new formats and transferring them to the catalog system described by the present invention.

The set of available presentations that are offered to a catalog licensee is dynamically derived from the list of those available and contain the fields and features that are subscribed to by the catalog licensee.

All user interfaces preferably follow the client/server paradigm, such that client interfaces can be used to control and manipulate information on local and remote servers. Catalog interfaces (295 in FIG. 1) allow network catalog users to use the catalog. Licensee interfaces allow catalog licensees to interact with the system and modify their profiles. Administrative interfaces 296 allow privileged users to perform administrative tasks.

Derivative electronic catalogs 130 may be distributed in any number of means. The embodiments described herein are only examples of such means. Catalog information may be served to users from a single master catalog 120, which contains all product information. Information from the master catalog 120 is masked in real-time to dynamically create derivative catalogs, such that users have access only to the products, fields and features subscribed to by the individual catalog licensee whose catalog they are browsing. Alternatively catalog information may be stored in a multiplicity of distributed servers, with a master server providing masking functions for multiple derivative catalogs. Each of the distributed servers contain either the entire product base or only the products which are required for the specific derivative catalogs 130 that are managed by that particular server. The master server and distributed servers can be interconnected through a communication network 250 or other means, to provide for transfer of new product information, billing and accounting data, and other such pertinent information. Alternative, standalone electronic catalogs may contain an encapsulated "snapshot" of catalog instructions and data, along with a catalog interpreter for execution on users' local machines. Although standalone catalogs may be downloaded from a central server, no information is transferred from the server to the catalog during runtime, nor is a connection required. Standalone catalogs may be updated from a central server via a computer network, although this is an optional capability.

Purchases that are handled through the catalog system of the present invention may be billed in a variety of means, which may include a transaction charge for each transaction, or a commission structure which levies a percentage-based fee.

Catalog licensees may be charged for usage of their licensed derivative catalogs through providing for a service charge or recurring charges. With respect to a service charge implementation, a fee for setup, updates or modifications of the derivative catalog 130 may be charged. With respect to periodic charges, a periodic fee for the upkeep, hosting and maintenance of the licensee's derivative catalog may be charged.

With reference back to FIG. 4, in order to filter a licensee subset 130, the product masking module 202 uses the master data set 120 as input, including a BVI for the master data set 120, step 400. The product masking module 202 reads the partitioning database entity 116 to retrieve the subset BVI for the licensee, step 402. The product masking module performs the filter operation for products, step 404. The following pseudo code illustrates sub-steps performed in step 404:

```
for i = 1 to max_products
    if prod[i] AND master[i] = = 1
        then output_product_list[i] = 1
    next i
``` wherein max_products is the length of the subset BVI for the licensee and master is the BVI for the complete master data set 120, and prod is the BVI the available records in the master data set 120.

Next, the field masking module 214 reads the partitioning database entity 116 to retrieve the master field mask BVI, and the subset field mask BVI for the licensee, step 406. The field masking module 214 performs the field filtering operation according to the following pseudo code, step 408:

```
for i = 1 to num_fields
    if field[i] AND field_mask[i] = = 1
        then output_field_list[i] = 1
    next i
``` wherein num_fields is the number of fields available in each record, field[i] represents the bit vector for the ith field in each record, field mask[i] is the ith bit vector in the field mask BVI, and output_field_list is the field list BVI for the subset 130.

The subset 130 catalog output from the operations described in FIG. 4 is the input to FIG. 5. In FIG. 5, the feature masking module 202 receives the output from FIG. 4 as input, step 500. The feature masking module 208 receives a master feature mask BVI, and the feature subset BVI from the partitioning database entity 116, step 502. The feature masking module 208 performs the feature masking function according to the following pseudo code, step 504:

```
for i = 1 to num_features
    if feature[i] AND feature_mask[i] == 1
        then output_feature_list[i] = 1
next i
``` wherein num_features is the number of all available features, feature[i] is the ith feature in the master feature BVI, feature_mask[i] is the ith feature in the feature subset BVI, and the output_feature_list is the BVI for the features that will be available to the subset 130.

The proper template is read from the template and presentation database entity 140, step 506. The template used is selected according to related template pointers stored in the metadata database entity 104. The template is processed with the subset 130, step 510. The module that prosecutes selection and processing of the template depends on the kind of output for the specific subset 130 as described above. The subset 130 is then presented to the user, step 512, according to the type of output as described above. The presentation of the subset catalog 130 may alternatively be in the form of an input file for a desktop publishing application such as QUARKXPRESS by Quark, Inc. of Denver, Colo., or ADOBE INDESIGN by Adobe Systems, Inc. of, San Jose, Calif.

With reference back to FIG. 6, a flow diagram illustrating the steps performed by the parametric search module 212 is shown. When a user 172 wishes to perform a parametric search on their subset 130; the licensee subset 130 is filtered. The product masking module 202 uses the master data set 120 as input, including a BVI for the master data set 120, step 600. The product masking module 202 reads the partitioning database entity 116 to retrieve the subset BVI for the licensee, step 602. The product masking module performs the filter operation for products, step 604. The following pseudo code illustrates sub-steps performed in step 604:

```
for i = 1 to max_products
    if prod[i] AND master+ i == 1
        then output_product_list[i] = 1
next i
``` wherein max_products is the length of the subset BVI for the licensee and master is the BVI for the master data set 120, output_product_list is the BVI master data set 120 of available records.

Next, the parametric search module 212 receives user entered selection criteria from the user 172, step 606. The parametric search module 212 uses the user entered selection criteria to perform the parametric search, step 608. The results of the parametric search performed in step 608 are presented, step 610. The user may wish to refine, i.e. expand or narrow, the search, step 612. If so, the processing moves back to step 606 using the current results of step 608 as input.

The parametric search performed in step 608 comprises performing a series of bitwise AND operations according to the number of refinements, plus the initial search performed. The master data set 120 contains a plurality of search BVIs matching all of the search criteria available to the user. Each of the search BVIs corresponds to a field or attribute from which the user 172 may select one or more particular values or ranges of values that are of interest. The parametric search module 212 selects the proper search BVI(s) to use in performing the parametric search. The parametric search module 212 performs a bitwise AND filtering operation according to the following formula, step 608:

```
for BVI_index = 1 to max_BVI
    for prod_index = 1 to max_products
        if prod[BVI_index][prod_index] AND
                    search_output_prod_list[prod_index] == 1
            then search_output_product_list[prod_index] = 1
    next prod_index
next BVI_index
``` wherein search_output_prod_list[prod_index] is the bit vector in the BVI for the list of product data records to be presented and prod[BVI_index][prod_index] is the bit vector for the currently selected BVI based on the recurrent user selected criteria.

Figure 6:
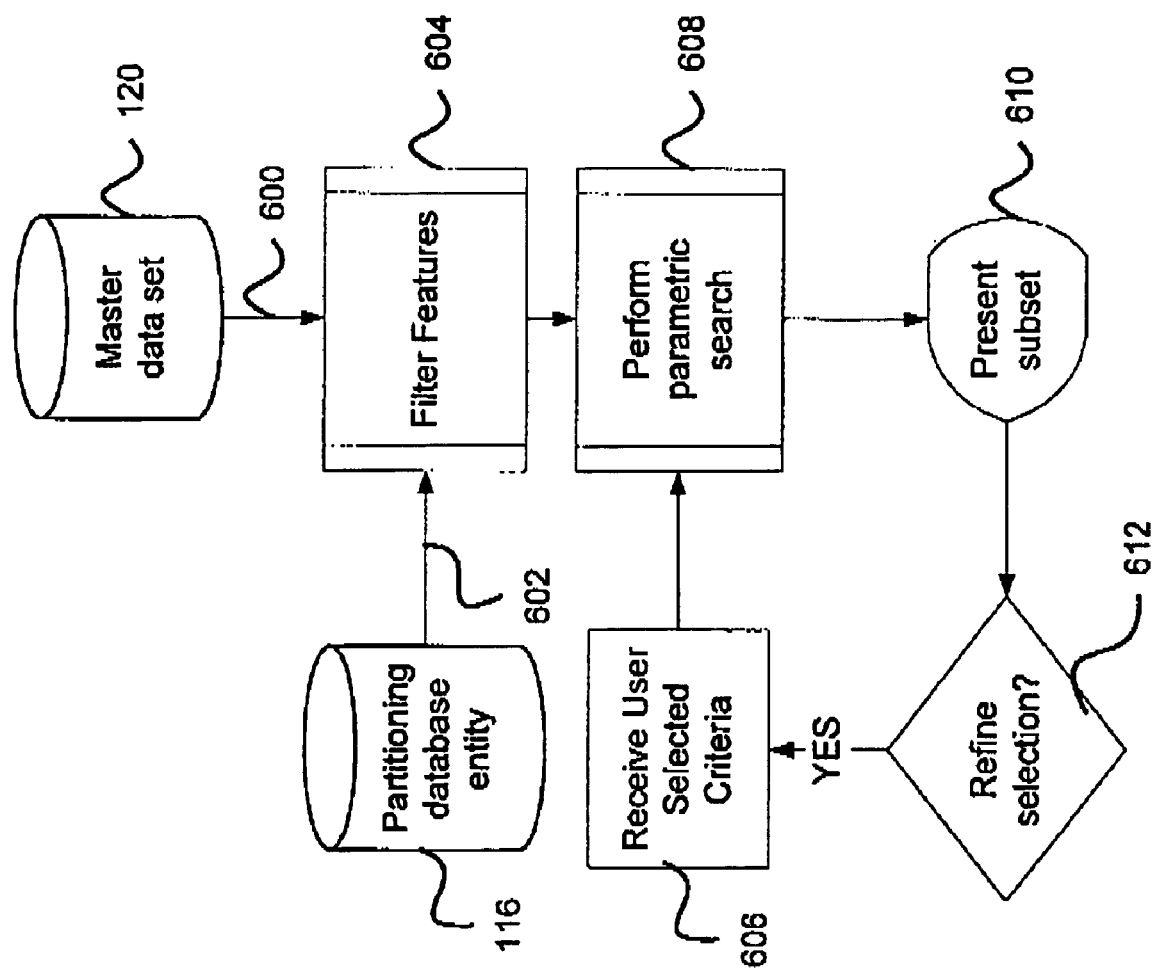
FIG. 6 is a data flow diagram illustrating the process by which a parametric search is executed in the system of FIG. 1.

The similar item locator 236 uses the same parametric logic described in FIG. 6 to allow the user to find products that are similar, but not identical, in results of a parametric search performed.

Figure 7:
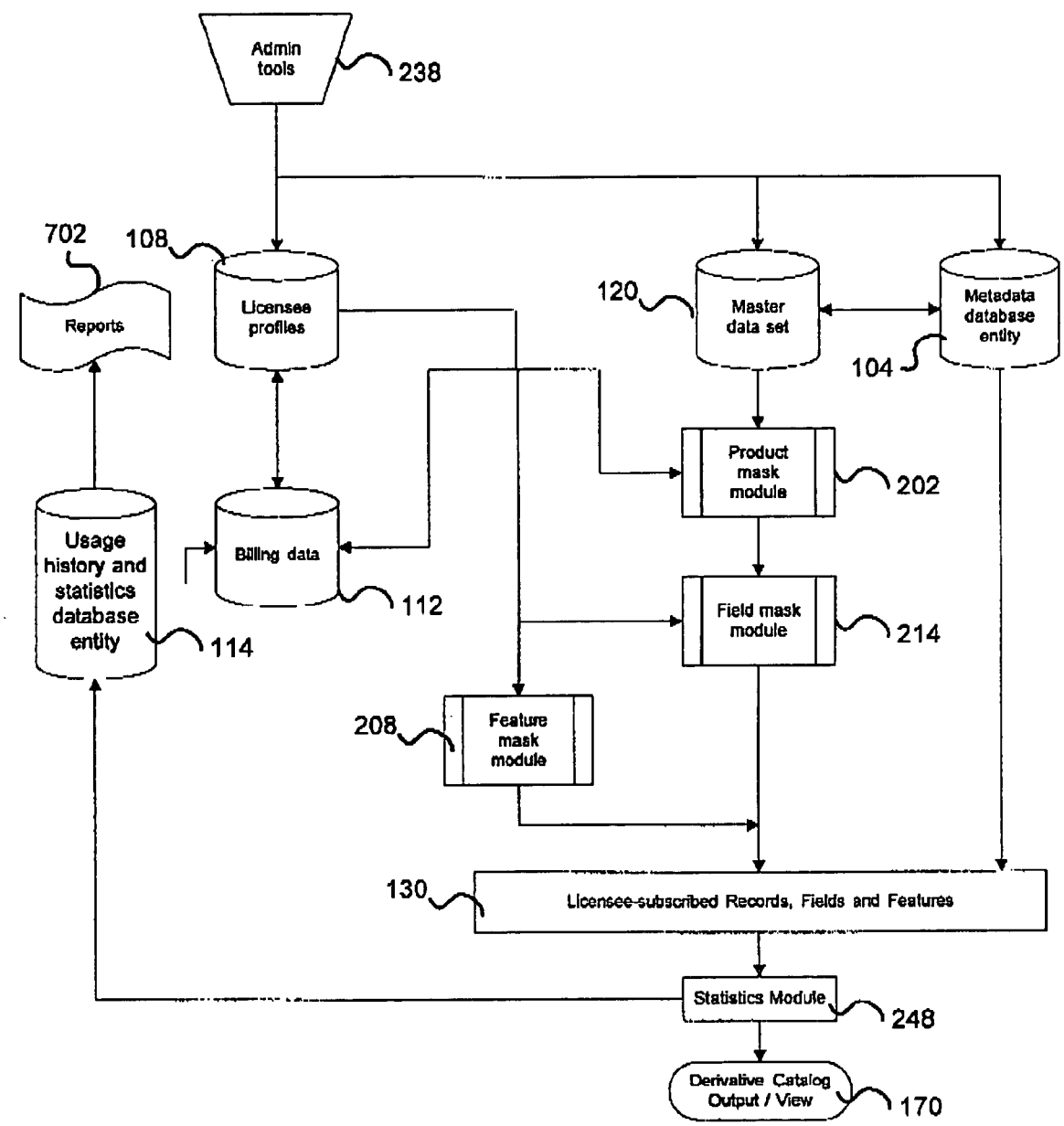
FIG. 7 is a data flow diagram illustrating basic data flow of the system of FIG. 1.

With reference to FIG. 7, an overall process diagram illustrating the interaction between the modules for derivative catalog output is shown. The administrative interface module 238 is used to manage the licensee profiles database entity 108. Database entity 108 interfaces with the billing and accounting database entity 112, which interfaces with the usage history and statistics database entity 114 to store statistical data on catalog subset 130-132 usage. The usage history and statistics database entity 114 may use a web analysis and statistical package 702 such as WEBTRENDS by the WebTrends, Corp. of Portland, Oreg., or CRYSTAL REPORTS by Seagate Software of Bellevue, Wash., to generate reports and bills.

The master data set 120 interfaces with the metadata database entity for input into the product masking module 202, field mask module 214, and feature mask module 208, which produce the output catalog subset 130. The statistics tracking module 248 detects and collects data such as record view usage, feature usage and other data that can be used in statistical, analytical, billing and other data collection processes to be stored in the usage history and statistics database entity 114. The catalog subset 130 may be displayed in the subset view 170.

Thus the reader will see that the present invention provides a means to quickly create multiple distinct views of a master product catalog, with each view acting as a seemingly independent full-function electronic catalog and commerce system.

While descriptions hereof contain many specifics, these should not be construed as limitations on the scope of the invention, but rather as an exemplification of preferred embodiments thereof. Other variations are possible. For example, catalog displays need not be limited only to computer screens, and may appear on television sets, Internet-aware appliances, or any other electronic or mechanical embodiment. Accordingly, the scope of the invention should be determined not by the embodiment(s) illustrated, but by the appended claims and their legal equivalents.

What is claimed is:

1. In a computer system, a method for generating custom catalogs from a master catalog comprising:

defining a master data set comprising a plurality of data records stored in a database on a computer;

configuring a first bit vector index to define a first set of available data records in said master data set;

configuring a second bit vector index to define a second set of available data records in said master data set;

configuring a third bit vector index to define a first set of available features in said master data set;

configuring a fourth bit vector index defining a second set of available features in said master data set;

performing a bitwise AND operation between said first bit vector index and said second bit vector index to select a first view data record set from said plurality of data records in said master data set;

performing a bitwise AND operation between said third bit vector index and said fourth bit vector index to yield a first view feature set; and, providing a first view to a first user comprising said first view data record set having said first view feature set.

2. The method of claim 1 further comprising:

configuring a fifth bit vector index to define a third set of available data records in said master data set;

configuring a sixth bit vector index defining a third set of available features in said master data set; and, performing a bitwise AND operation between said first bit vector index and said fifth bit vector index to select a second view data record set from said plurality of data records in said master data set;

performing a bitwise AND operation between said third bit vector index and said sixth bit vector index to yield a second view feature set; and, providing a second view to a second user comprising said second view data record set having said second view feature set.

3. The method of claim 2 further comprising: preventing said first user from accessing said second view of said second user.

4. The method of claim 2 further comprising: allowing a first user to execute a first executable feature.

5. The method of claim 3 further comprising: allowing said second user to execute a second executable feature.

6. The method of claim 5 further comprising: preventing said first user from executing said second executable feature.

7. In a computer system, a method for generating user defined timeshared custom catalogs from a master catalog comprising:

defining a master data set comprising a plurality of data records stored in a database on a computer;

configuring a first bit vector index to define a first set of available data records in said master data set;

configuring a second bit vector index to define a second set of available data records in said master data set;

configuring a third bit vector index to define a first set of available features in said master data set;

configuring a fourth bit vector index defining a second set of available features in said master data set; and, performing a bitwise AND operation between said first bit vector index and said second bit vector index to select a first view data record set from said plurality of data records in said master data set;

performing a bitwise AND operation between said third bit vector index and said fourth bit vector index to yield a first view feature set;

providing a first view to a first user comprising said first view data record set having said first view feature set;

generating a first result query bit vector by performing a bitwise OR between each of a first plurality of values constraining a first lookup field;

generating a second result query bit vector by performing a bitwise OR between each of a second plurality of values constraining a second lookup field;

generating a multiple constraint result query bit vector by performing a bitwise AND between said first result query bit vector and said second result query bit vector; and, returning a corresponding result data record for each logical ONE in said multiple constraint result query bit vector.

8. A system for generating user defined timeshared derivative catalogs from a master catalog, comprising:

a computer configured to execute a dynamic partitioning module and a masking module;

said dynamic partitioning module configured to obtain user profile information and retrieve a user defined first view via said masking module;

said masking module configured to provide said user defined first view to a first user by performing a bitwise AND operation between a first bit vector index and a second bit vector index to select a first view data record set from a plurality of data records in a master data set and by performing a bitwise AND operation between a third bit vector index and a fourth bit vector index to yield a first view feature set comprising a first view data record set having said first view feature set;

said first bit vector index defining a first set of available data records in said master data set comprising a first single bit corresponding to a first available data record in said plurality of data records in said master data set;

said second bit vector index defining a second set of available data records in said master data set comprising a second single bit corresponding to a second available data record in said plurality of data records in said master data set;

said third bit vector index defining a first set of available features in said master data set comprising a third single bit corresponding to a first available feature associated with said plurality of data records in said master data set; and, said fourth bit vector index defining a second set of available features in said master data set comprising a fourth single bit corresponding to a second available feature in said plurality of data records in said master data set associated with said first view data record set.

9. The system of claim 8 further comprising:

a fifth bit vector index defining a third set of available data records in said master data set comprising a fifth single bit corresponding to a third available data record in said plurality of data records in said master data set;

a sixth bit vector index defining a third set of available features in said master data set comprising a sixth single bit corresponding to a third available feature in said plurality of data records in said master data set; and, wherein said masking module is further configured to provide a second view to a second user by performing a bitwise AND operation between said first bit vector index and said fifth bit vector index to select a second view data record set from said plurality of data records in said master data set and by performing a bitwise AND operation between said third bit vector index and said sixth bit vector index to yield a second view feature set wherein said second view comprises said second view data record set having said second view feature set.

10. The system of claim 9 wherein said masking module is further configured to prevent said first user from accessing said second view of said second user.

11. The system of claim 8 wherein said dynamic partition module is configured to identify said set of first available data records in said master data set by extracting said first single bit.

12. The system of claim 8 wherein said dynamic partition module is configured to access one bit per master data record.

13. The system of claim 8 wherein said first bit vector index is encoded.

14. The system of claim 8 wherein said system is configured to perform interactive browsing by obtaining a bit vector resulting from bitwise ORs and ANDs when said user defined first view is accessed without using a temporary file of query results.

15. The system of claim 14 wherein said system is configured to reduce repeated overhead by storing intermediate resulting bit vectors for application of additional constraints during an iterative query.

16. The system of claim 8 further configured to perform a fast multiple constraint query on a single lookup field in said user defined first view, said system configured to:
  generate a result query bit vector by performing a bitwise OR between each of a plurality of values constraining a first lookup field;
  return a corresponding result data record from said user defined first view for each logical ONE in said result query bit vector.

17. The system of claim 8 further configured to perform a fast multiple constraint query on multiple lookup fields in said user defined first view, said system configured to:
  generate a first result query bit vector by performing a bitwise OR between each of a first plurality of values constraining a first lookup field;
  generate a second result query bit vector by performing a bitwise OR between each of a second plurality of values constraining a second lookup field;
  generate a multiple constraint result query bit vector by performing a bitwise AND between said first result query bit vector and said second result query bit vector; and
  return a corresponding result data record for each logical ONE in said multiple constraint result query bit vector.

18. The system of claim 8 comprising a feature masking module is configured to allow said first user to execute a first executable feature.

19. The system of claim 18 wherein said feature masking module is further configured to allow said second user to execute a second executable feature.

20. The system of claim 18 wherein said feature masking module is further configured to prevent said first user from executing said second executable feature.

* * * * *